United States Patent [19]

Davidow

[11] Patent Number: 4,680,750

[45] Date of Patent: Jul. 14, 1987

[54] UNIVERSAL HIGH-SPEED SPAN LINE SWITCH

[75] Inventor: Clifford A. Davidow, Reno, Nev.

[73] Assignee: Lynch Communication Systems, Inc., Reno, Nev.

[21] Appl. No.: 656,550

[22] Filed: Oct. 1, 1984

[51] Int. Cl.$^4$ ............................. H04J 3/02; H04B 3/46
[52] U.S. Cl. .................................... 370/16; 340/825.01
[58] Field of Search ................... 370/16; 179/175.3 S, 179/175.3 R; 371/11, 22, 8; 340/825.01

[56] References Cited

U.S. PATENT DOCUMENTS

| | | | |
|---|---|---|---|
| 3,457,373 | 7/1969 | Van Duuren et al. | 370/16 |
| 3,649,915 | 3/1972 | Mildonian, Jr. | 325/42 |
| 3,864,533 | 2/1975 | Erlund | 179/175.3 S |
| 3,983,340 | 9/1976 | Lima et al. | 179/175.3 S |
| 4,042,794 | 8/1977 | Lima et al. | 179/175.3 S |
| 4,365,248 | 12/1982 | Bargeton et al. | 179/175.3 S |
| 4,393,493 | 7/1983 | Edwards | 179/175.3 S |
| 4,477,895 | 10/1984 | Casper et al. | 179/175.3 S |

Primary Examiner—Douglas W. Olms
Attorney, Agent, or Firm—Weissenberger & Peterson

[57] ABSTRACT

Malfunctions in an automatic span line switch due to resonances in high-speed span lines are avoided by interposing signal-free intervals whenever the switch causes a possible phase change to occur in the signal being supplied to the span, preventing the transmission of partial signal pulses, and using quasi-random code and keep-alive signals. Unnecessary phase changes are avoided by verifying the validity of data before allowing it to be put on the span following a data loss; disabling the error detection circuitry for a limited time following a switching operation; and preventing the switching of low-priority span on standby if the failure has been remedied during the standby period. In other aspects of the invention, the switch is made adaptable to various types of high-speed spans and to a wide range of quality requirements by allowing for individual adjustment of loss-of-signal time, burst protection time, error count, and bit count for failure and restoral detection, and by selectively allowing different types of errors to be detected. Finally, backup due to one-sided restoral is eliminated by refailing a restored switch if its mate does not restore.

17 Claims, 12 Drawing Figures

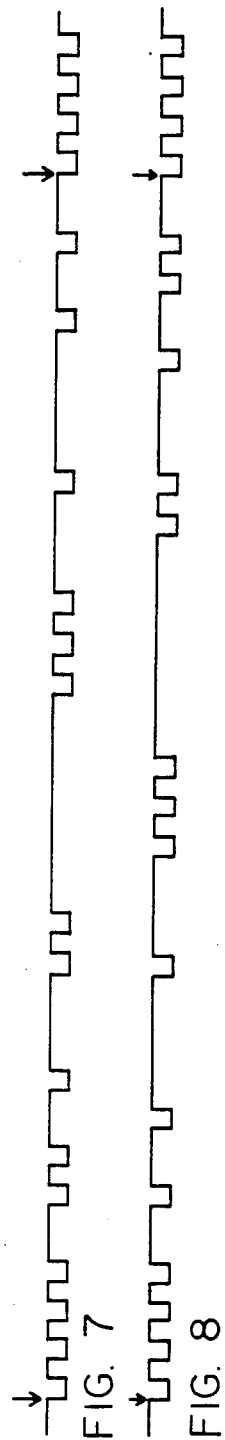
FIG. 7
FIG. 8
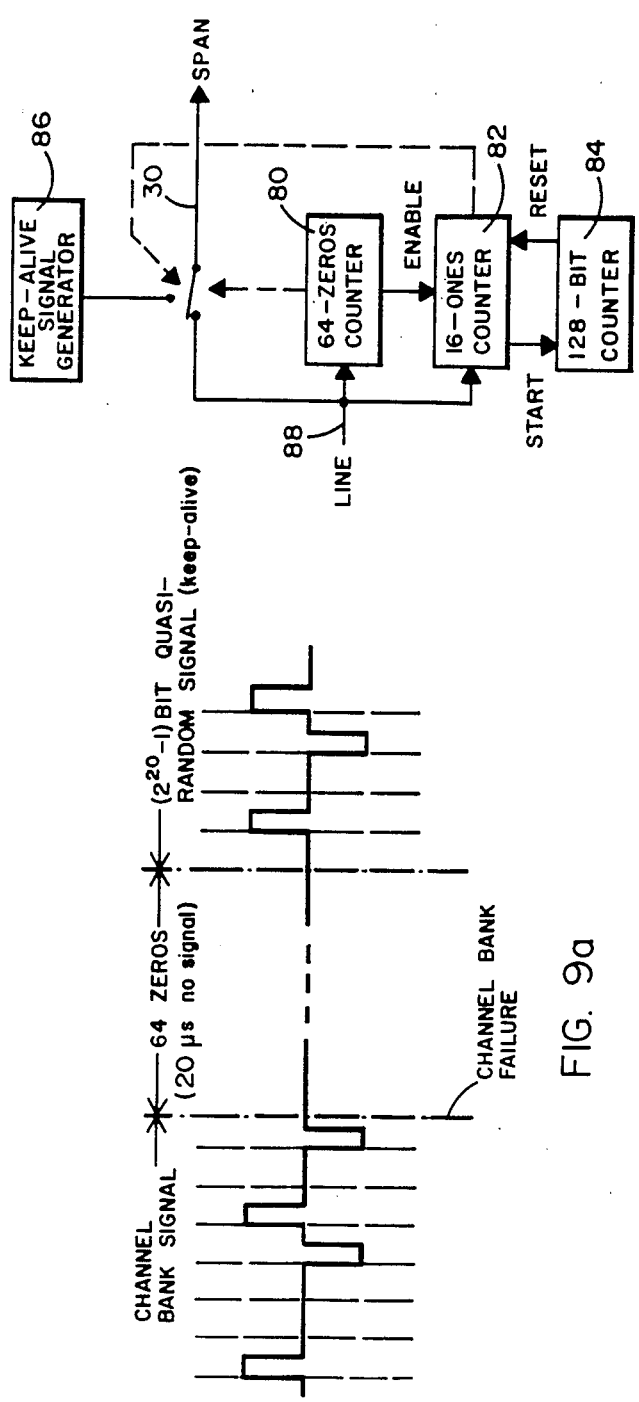
FIG. 9b
FIG. 9a

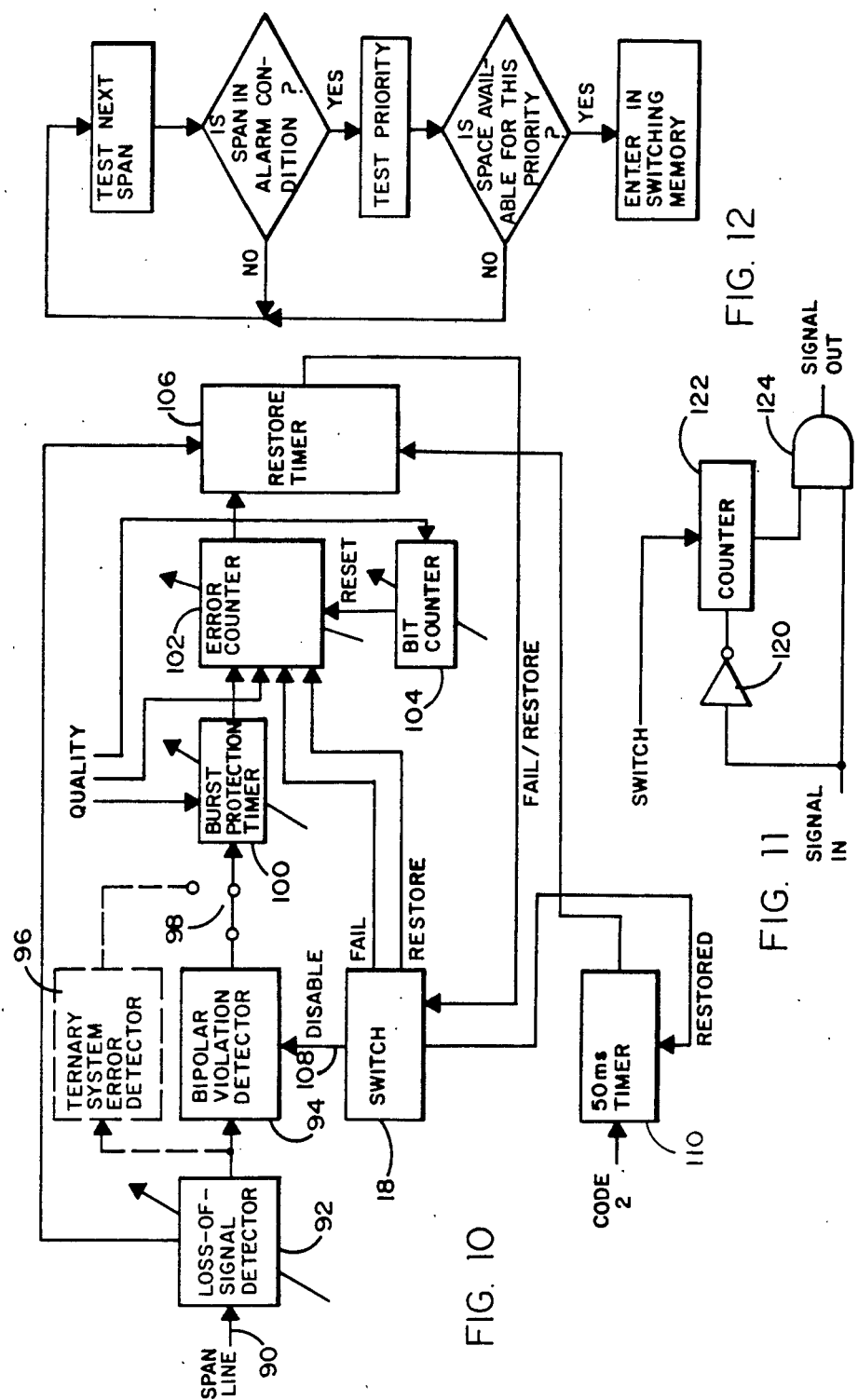

UNIVERSAL HIGH-SPEED SPAN LINE SWITCH

SUMMARY OF THE INVENTION

This invention relates to span line switches for pulse code modulated telephone lines, and more particularly to a switch of that type adapted for use with various types of high-speed span lines.

BACKGROUND OF THE INVENTION

U.S. Pat. Nos. 3,983,340 and 4,042,794 to Lima disclose a span line switch which automatically switches pulse code modulated telephone signals from a failed span to a spare span without interrupting the conversation. The switch of these patents was originally designed for use with 1.544 MHz Western Electric T1 spans, and it has been a successful commercial product in that environment for a number of years.

When, however, the switch of the Lima patents was used with high-speed spans such as Western Electric's T1C and T1D, ITT's T148C, and Lenkurt's Modified Duobinary, all of which work on a 3.152 MHz standard, malfunction patterns began to appear. Investigation traced most of these malfunction patterns to the internal resonance characteristics of these spans, and to the resulting increased sensitivity of these high-speed spans to phase changes in the signal and to oscillations induced by repetitive signal patterns.

In addition to having the above-identified operational problems with high-speed spans, the switch of the Lima patents was not usable with ternary systems such as the T148C, or other systems where bipolar violations were not preserved, because the detection of bipolar violations was an integral part of its error detection system.

SUMMARY OF THE INVENTION

The present invention overcomes the above-mentioned problems of the prior art when used with high-speed spans by minimizing phase changes, introducing a signal-free settling interval at phase change points, and substituting quasi-random codes which are not susceptible of producing oscillation-generating bit patterns.

In one aspect of the minimization of phase changes, the unintentional reswitching of a span after restoration is prevented by disabling the error detection system for a predetermined interval of time following restoration. In another, the error detection system is made adjustable in all its parameters to accommodate the individual characteristics of various types of high-speed span lines, and to thereby minimize erroneous failure indications.

Lockup due to switching on only one side of the span is prevented in the switch of this invention by retransferring a restored switch if the span line fails to restore on both sides.

In addition, the bipolar violation function is separated from the error detection system to allow the substitution of data error detection equipment.

BRIEF DESCRIPTION OF THE DRAWINGS

FIG. 7 is a time-amplitude diagram illustrating Code 1.

FIG. 8 is a time-amplitude diagram illustrating Code 2.

FIG. 9a is a time-amplitude diagram illustrating the operation of the switch in the event of a channel bank failure.

FIG. 9b is a block diagram of the channel bank failure and restoration detection system.

FIG. 10 is a block diagram of the circuitry involved in the actuation of the switch.

FIG. 11 is a block diagram of the circuit which prevents the transmission of partial pulses; and FIG. 12 is a flow chart illustrating the standby function of a span which is disabled but does not currently have sufficient priority for switching.

DESCRIPTION OF THE PREFERRED EMBODIMENT

Figure 1:
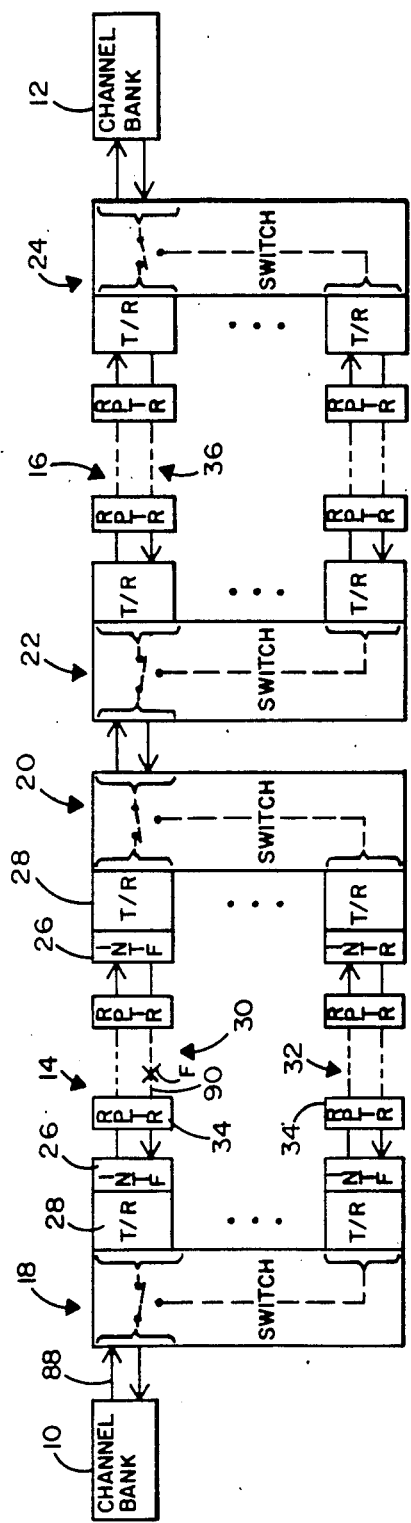
FIG. 1 is a general view of a telephone communication system using the apparatus of this invention.

FIG. 1 shows a telephone system in which digitized information in the form of pulse code modulated (PCM) data is being transmitted between channel bank 10 and channel bank 12 over span cables 14 and 16 connected in series. In FIG. 1, span cable 14 may, for example, be a Western Electric T1D span system while span cable 16 may be a Western Electric T1C span system. The span line switches 18, 20, 22 and 24 are designed to interface with a T1C span, and interfaces 26 must therefore be provided with any other type of span to make it compatible with the transmit/receive sections 28 of switches 18 and 20.

Switches 18 through 24 are constructed essentially in accordance with the teachings of U.S. Pat. Nos. 3,983,340 and 4,042,794 to Lima except for the differences pointed out hereinafter. Their function is to detect any failure such as the break F in span line 30, and to switch the data transmission on span line 30 to the spare span line 32 with a minimum loss of data.

The span cables 14 and 16 are provided at intervals with repeaters 34 which regenerate the signal-constituting pulses when they degenerate along the cables 14 and 16. The repeaters 34 derive their internal clock from the clock of the incoming signal. Because the internal clocks of the repeaters 34 have a certain amount of inertia, and because the high-speed span systems have inherent resonance characteristics which are particularly pronounced in the T1D system, high-speed span systems are sensitive to sudden phase changes in the incoming signal. As a result, they are subject to spurious oscillation patterns when the signal phase suddenly changes, particularly in the T1D configuration. A switching operation on cable 14 by switches 18, 20 switching the signal path between span line 14 and spare span line 32 may consequently result in a prolonged burst of errors which will eventually cause the downstream switches 22 and 24 to trip also, even though span 36 is perfectly good. In extreme cases, internal resonances may occur within a span which can lock up the span for a considerable period of time.

Figure 2:
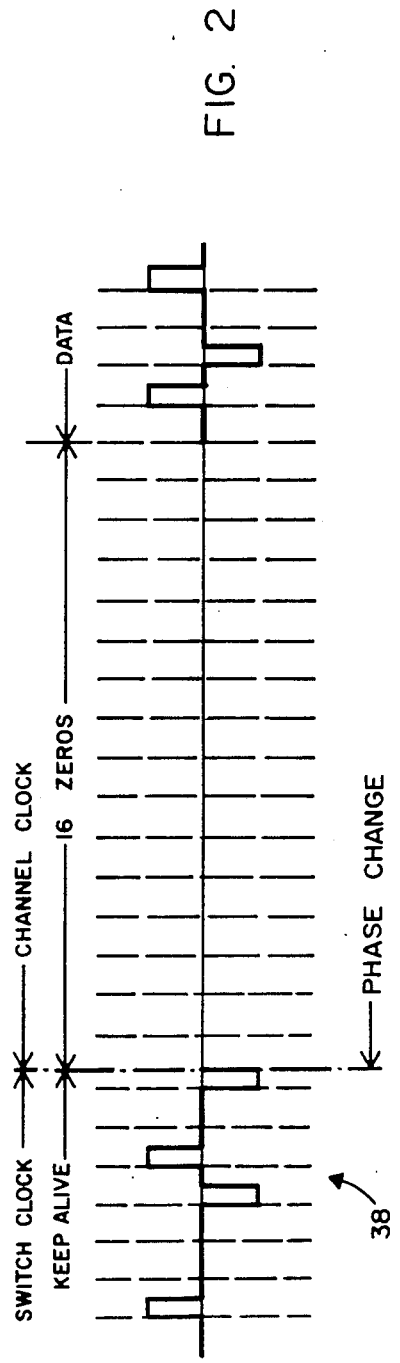
FIG. 2 is a time-amplitude diagram illustrating the settling interval following a phase shift in accordance with this invention.
Figure 5:
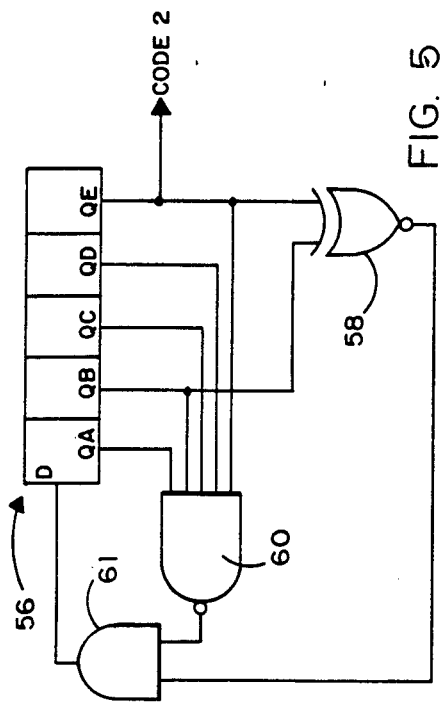
FIG. 5 is a logic diagram of a quasi-random Code 2 generator.

To overcome this problem, the invention provides, as shown in FIG. 2, for the insertion of sixteen zeroes into the pulse train whenever a phase change occurs. For example, in FIG. 2, a keep-alive signal 38 may be normally submitted over the spare span 32. The keep-alive signal 38 is generated by the internal circuitry of switch 18, and although its frequency is the same as that of the data signals from channel bank 10, its phase may be different because the channel bank 10 and switch 18 have separate clocks which are not synchronized with each other.

If a failure now occurs in span 30, and switch 18 transfers the data signals to span 32, a sudden phase change will occur in span 32 when the signal in that span switches from the switch clock phase of the keep-alive signal to the channel bank clock phase of the data signals. In order to avoid spurious resonances in span 32, the switch 18 inserts sixteen zeroes in the pulse train immediately following the switchover. This provides sufficient time for resonances in span 32 to die down, and for the repeaters 34 in span 32 to gradually lose their stability so as to become able to quickly lock onto the phase of the channel bank signal.

The above-described zero insertion results in only an insignificantly small loss of data, yet prevents the much more serious loss of data which would result from spurious resonances within span 32. As a practical matter, the zero insertion reduces error generation due to phase shifts from about 3–4 seconds or more to about 150 milliseconds in the TID.

FIGS. 3 through 8 deal with the switching codes by which switches 18, 20 transmit switching information to each other in conformity with the teachings of the Lima patents. In the Lima patents, the switching codes 1 and 2 involved in the switching and restoral operations are, respectively, 100 and 011 repeated indefinitely. It was discovered that in high-speed spans, such codes with a short repetition pattern tend to set up resonant oscillations within the span system that may, in extreme cases, cause the span system to drive itself and become unable to transmit any information. The invention overcomes this problem by substituting for Codes 1 and 2 of the Lima Patents a new set of codes which are quasi-random in nature, i.e. which have an apparently random pattern that repeats no sooner than every 31 bits.

Figure 3:
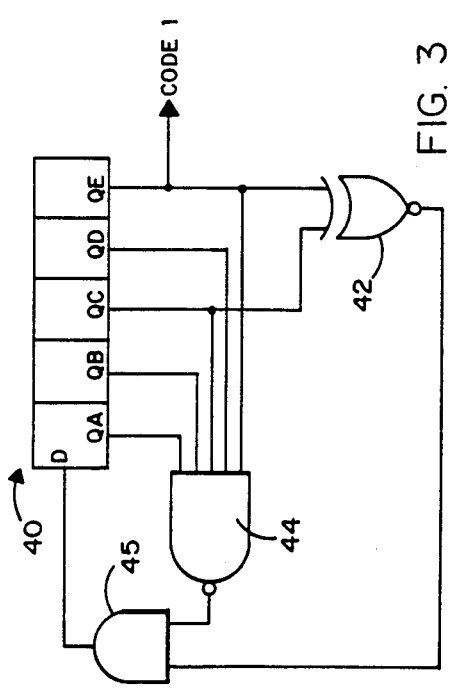
FIG. 3 is a logic diagram of a quasi-random Code 1 generator.

FIG. 3 illustrates the generation of such a quasi-random code by providing a five-bit shift register 40 whose third (QC) and fifth (QE) outputs are combined in an EXCLUSIVE-NOR gate 42 and fed back to the input D of shift register 40. The output QE of the fifth bit of shift register 40 is a quasi-random code which is used in the span line switch of this invention as Code 1.

A lockup condition can occur in the circuit of FIG. 3 if all five bits of the shift register 40 are at logic 1 (which they would be on powerup if the bias voltage of the shift register is negative). To prevent this situation, a NAND gate 44 is provided to force a zero through AND gate 45 into the first bit whenever all five bits are one.

At the receiving end in switch 20, the quasi-random Code 1 is decoded by feeding it into a similar shift register 46 whose QC and QE outputs are also combined in an EXCLUSIVE-NOR gate 48. By combining the output of gate 48 with the incoming code train in an EXCLUSIVE-NOR gate 50, a pulse train consisting of all ones is produced at the output of gate 50. This output is applied to a counter 52 which generates a "Code 1 present" signal 54 whenever it sees an uninterrupted series of ones for at least 30 μs.

Figure 6:
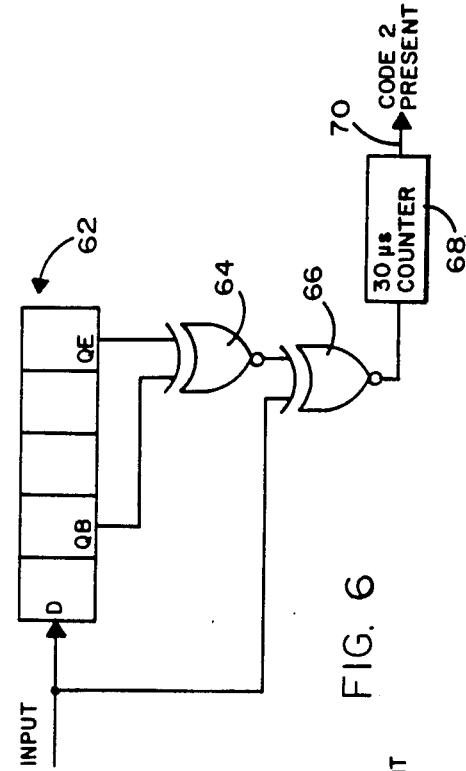
FIG. 6 is a logic diagram of a Code 2 decoder in accordance with the invention.
Figure 4:
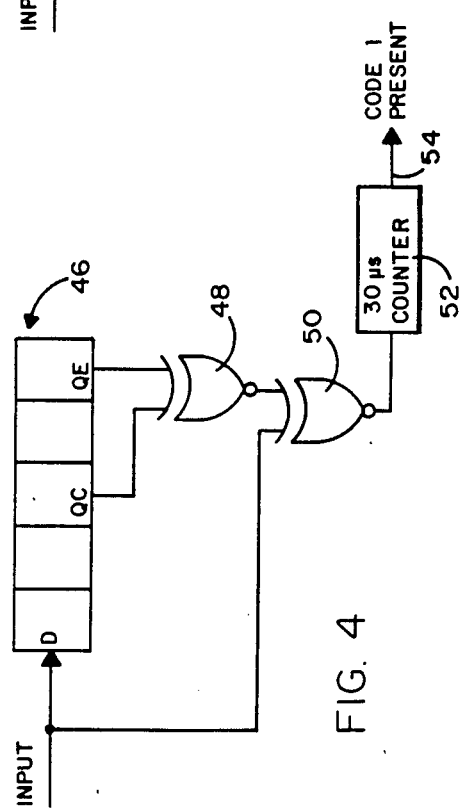
FIG. 4 is a logic diagram of a Code 1 decoder in accordance with the invention.

The generation and detection of Code 2 is similar to that as just described for Code 1 except that the shift register 56 is connected so that the second and fifth outputs QB and QE combined in EXCLUSIVE-NOR gate 58. A NAND gate 60 and an AND gate 61 are provided for the same lockup-preventing purpose as discussed above in connection with FIG. 3. By connecting a shift register 62 in the same manner as shift register 56 and combining the input signal with the output of gate 64 in an EXCLUSIVE-NOR gate 66, a pulse train of all ones will be produced whenever the input is Code 2. As shown in FIG. 6, the counter 68 will produce a "Code 2 present" signal 70 whenever the output of gate 66 is an interrupted train of ones for 30 μs or more.

FIGS. 7 and 8 illustrate Code 1 and Code 2, respectively.. It will be noted that both of these codes repeat after thirty-one bits, which is consistent with the pattern repetition rate of $(2^n-1)$ bits for this type of circuit, where n is the number of bits in the shift register.

In the span line switch of the Lima patents, the keep-alive signal which kept any unused span such as the spare span 32 functioning when it was not in use for data transmission, was a pulse train of all ones. This pattern cannot be used with high-speed spans, as it is also subject to setting up resonances which may lock up the span. Consequently, the switch of the invention uses a quasi-random keep-alive signal generated by a twenty-bit shift register (not shown). This has the additional advantage that the quasi-random signal generated by a twenty-bit shift register EXCLUSIVE-NOR'd at the seventeeth and twentieth outputs is the industry standard test signal for testing PCM equipment. Consequently, the keep-alive signal can be used directly as the span test signal without the need for any additional test equipment.

In the span line switch of the Lima patents, when a channel bank failure occurred, the switch would substitute a keep-alive signal on the span 30 or 32 after thirty-two zeroes and would return to the channel bank signal as soon as the first data 1 from the channel bank reappeared. In the higher bit rate span lines, it is possible to have more than thrity-two zeroes in normal operation. Therefore, in order to avoid an excessive number of phase shifts, the switch of this invention waits for 20 μs (i.e. sixty-four zeroes) following the last 1 in the data train from the channel bank before substituting the keep-alive signal (FIG. 9a). This provides ample time for the span system resonances to settle and makes sure that the channel bank signal has really been lost.

Likewise, the switch of this invention does not immediately return to the data signal as soon as the first data 1 appears. Instead, as shown in FIG. 9b, the 64-zeroes counter 80 enables a 16-ones counter 82. As soon as a one appears in the data from the channel bank following the 20 μs all-zeroes waiting interval, the counter 82 is enabled and begins to count data ones. At the same time, a 128-bit counter 84 is started. The counter 84 resets counter 82 whenever less than 16 ones occur in any sequence of 128 bits. Only when 16 or more ones are present in any 128-bit sequence is the span 30 or 32 disconnected from the keep-alive signal generator 86 and reconnected to the line 88 coming from the channel bank 10 (after an intervening 16-bit resonance settling pause as first described hereinabove).

FIG. 10 shows the error-evaluating circuitry which determines whether a span line has indeed failed or, after a failure, whether it is ready to be reset. For example, if the condition of line 90 of span 30 is to be evaluated, the signal from line 90 is first checked by the loss-of-signal detector 92 for th presence of any signal at all.

In the device of this invention, the loss-of-signal detector 92 is made adjustable to respond to the absence of signals for varying periods of time to accommodate the operating parameters of the various types of span lines mentioned herein.

For example, most of the above-listed span systems can be assumed to have failed if no signal is received from them for more than a few milliseconds.

ITT's T148C system, however, stops transmitting if its internal error rate is greater than $10^{-4}$ but does not restart until the internal error rate drops below $10^{-6}$. Consequently, a transient disturbance on a T148C line results in a period of signal loss which can approach twenty milliseconds. In the preferred embodiment, the loss-of-signal detector 92 is therefore made adjustable from 5 ms to 20 ms.

Next, the signal from span line 90, if present, is checked by the bipolar violation detector 94 or, in the case of a ternary system such as the T148C, by an appropriate data error detector 96. It should be noted that whereas in the switch of the Lima patents, the bipolar violation detector function is integrated with the timing and counting functions which follow, it is separated from them in the device of this invention to enable a strap 98 to be strapped either for use with a bipolar violation detector 94 or with a data error detector 96. In this manner, the device of this invention is able to handle ternary and other types of spans in which bipolar violations are not preserved, as well as bipolar spans.

The burst protection timer 100 is started by a bipolar violation or data error and is designed to register any number of bipolar violations or data errors occurring within its timing interval as a single error. This to avoid unnecessary switching because transient events on a span may result in a sudden burst of hundreds or even thousands of bipolar violations even though the line is still good and returns to normal in short order.

The error indications put out by burst protection timer 100 are counted in an error counter 102. On the first count, a bit counter 104 is started. If the error counter 102 overflows before the bit counter 104 does, a FAIL signal goes out on line 105 from restore timer 106, and the timer 106 starts a twenty-one second count. The FAIL signal actuates the switch 18 in the manner described in the Lima patents, to transfer the data signal to another span such as 32.

Each time the error counter 102 overflows before being reset by an overflow of bit counter 104 (or another failure indicium such as a loss-of-signal indication or an output from timer 110 occurs), the restore timer 106 is reset to start another twenty-one second count. When the line quality is once again sufficiently good for the restore timer 106 to time out before being reset, a RESTORE signal goes out on line 105. The RESTORE signal causes switch 18 to restore, i.e. to transfer the data signals back to the now repaired span 30.

Following a restore operation, the switch 18 of this invention disables the error detection circuitry for about 600 milliseconds via line 108. This prevents transients caused by the switching itself from causing another switching operation at switch 18.

To avoid repeated switching, a span should not be restored until its quality is nearly one order of magnitude better than it was at the time of failure. Thus, at a quality rating of $10^{-4}$, span line 90 of span 30 may be considered to have failed when the error rate exceeds 128 errors in 1.28 megabits, and span 30 may not be restored to service until the error rate drops below sixteen errors in 1.28 megabits. Likewise, at a quality rating of $10^{-7}$, span line 90 may be considered to have failed on eight errors per sixty-four megabits, and to be ready for restoration to service on one error per sixty-four megabits.

The switch of the Lima patents counted a fixed sixteen errors, with the only variable being the bit count. This arrangement, however, will not work at the high quality ratings required by high-speed spans. At a quality rating of $10^{-7}$, a rate of one error per sixty-four megabits translates into sixteen errors per 1024 megabits. At a bit rate of 3.152 MHz, it takes more than five minutes to count 1024 megabits—much too long for a periodic resetting of restore timer 106 if the failure continues. Consequently, adjustability of the error count is required so that the bit counter 104 need not count more than sixty-four megabits (which takes a little over twenty seconds).

At the other end of the scale, adjustability of the bit counter 104 is also necessary to accommodate a wide range of quality ratings. Failure at a quality rating of $10^{-4}$ would correspond to 6400 errors in sixty-four megabits. Even with a minimal burst protection of 2.4 ms for a T1D span system, it would take a minimum of more than 15 seconds for a totally bad span line to switch—an intolerably long service interruption. Consequently, and considering that the longest tolerable failure detection time is on the order of one-third of a second, the bit counter 104 must be able to go down to a count low enough (e.g. 1.28 megabits) to complete the corresponding error count (e.g. 128 errors) required for a failure indication in that time or less.

Typical settings for various types of span systems are detailed in the following table: T,0130

It will be noted that with those span systems which require a lesser amount of burst protection, the failure detection time can be made shorter. In either event, the failure detection time for any given span system is essentially independent of the quality rating. Also, at the higher quality ratings, the burst protection time can be made longer so as to make the switch less sensitive to transient error bursts.

For the values in the table, the burst protection timer 100 needs to be adjustable from 0.3 ms to 40 ms; the error counter 102 needs to be adjustable from 1 to 128; and the bit counter 104 needs to be adjustable from 1.28 Mbits to 64 Mbits.

FIG. 10 also illustrates the handling of a situation in which a span restores on one side but not the other. As discussed in more detail in the Lima patents, the switch which has first seen the failure F in line 90 of span 30 (in this instance switch 18) transfers to the spare span 32 and advises its mate (in this case switch 20) by sending Code 1 that it should also transfer to the spare span 32. As soon as switch 20 sees Code 1 for 30 µs, it transfers and begins to send Code 1 into the failed line 90 for 21 seconds. After this interval, switch 20 sends Code 2 into line 90 as long as necessary.

When the failure F has been remedied, switch 18 starts to see Code 2. When it has seen good Code 2 for 21 seconds, it sends a short (e.g. 40 µs) burst of Code 2 back to switch 20. At this point, both switch 18 and switch 20 send and receive Code 2 simultaneouslY. In either switch, the simultaneous sending and receipt of Code 2 for 30 µs causes a restoral. Consequently, switches 18 and 20 restore simultaneously so as to minimize loss of data during restoral. It is possible that on rare occasions (e.g. in a thunderstorm) a momentary failure may occur on the span 30 just as the burst of Code 2 is transmitted by switch 18. If this occurs, switch 18 will restore but switch 20 will remain transferred, thereby interrupting the data transmission permanently. To prevent this occurrence, the span line switch of this invention is equipped with a 50 ms timer 110 which is activated by the restoral of switch 18. If switch 20 fails to restore upon receiving the burst of Code 2, it will continue to send Code 2 to switch 18. Consequently, if the timer 110 times out while switch 20 is still sending Code 2, a mismatch has occurred. The timer 110 in switch 18 thereupon puts out a failure signal which causes the switch 18 to retransfer and to reinitiate the restoral cycle.

Some high-speed span systems, particularly the TID, are sensitive to the transmission of less-than-full-length pulses. To avoid this, the switch of this invention includes the circuit of FIG. 11, in which the transmission of the first 1 following any switching operation is inhibited by the AND gate 124. To accomplish this, the switching operation may be used to reset a one-step counter 122 which counts the output of the inverter 120.

If a data 1 is present at the time of switching, the counter 122 remains reset, blocking the gate 124, until the end of the data 1 pulse. At that time, it counts up one count, immediately overflows, and thereby unblocks the gate 124 until another switching operation again resets the counter 122.

In the switch of the Lima patents, any failed span was entered into the switch memory as requiring a switching operation. If a spare span was available and the failed span had sufficient priority, the switching operation was performed immediately. However, if no spare span was available and the failed span did not have sufficient priority to "bump" another, the switch request would remain in memory until such time as a span became available. The switching operation was then performed.

Not infrequently, however, a temporary failure condition in a low-priority span would clear itself before a spare span became available; yet a short back-and-forth switching operation would still be performed as soon as a spare span did become available. Because this mode of operation causes unnecessary phase changes in the span line signal, the switch of this invention records the failure of a span as an alarm condition but does not enter it into the switch memory unless a spare span is available for immediate transfer. If no span is available, the failed span is periodically reexamined at frequent intervals to see if it is still in an alarm condition. If the failure happens to cure itself before any switch occurs, the failed span is taken out of alarm condition, and no unnecessary switching operations are performed. FIG. 12 illustrates the program flow which causes this reexamination to take place.

I claim:

1. In a PCM telephone span line switch which is arranged to automatically transfer data signals from a span contaiing a failed span line to a spare span, and which at times during its operation substitutes internally generated code and keep-alive signals for one or more of the data signals normally transmitted through said switch over a group of resonant span lines from a channel bank, the phase of said internally generated signals being independent of the phase of said data signals, the method of preventing span line disturbances as a result of the operation of said switch, comprising the steps of:

(a) interposing, between each transmission from said switch of signals in one of said phases and a transmission of signals in the other of said phases, a transmission of a signal consisting of a number of consecutive zeroes sufficient to prevent the occurrence in said span of signal errors sufficient to trigger a transfer operation in another span line switch downstream from said span, but insufficient to prevent its interpretation of said interposed signal as a loss-of-signal condition.

2. The method of claim 1, in which the number of said consecutive zeros is sixteen.

3. The method of claim 1, further comprising the step of using quasi-random signals as the code signals and keep-alive signals for the operation of said switch.

4. The method of claim 3, in which said code signals include first and second code signals which are the quasi-random signals generated by a five-bit shift register whose third and fifth, and second and fifth bits, respectively, are EXCLUSIVE-NOR'd to provide the input of said shift register.

5. The method of claim 3, in which said keep-alive signal is the quasi-random signal generated by a twenty-bit shift register whose seventeenth and twentieth bits are EXCLUSIVE-NOR'd to provide the input of said shift register.

6. The method of claim 1, in which, if said transmissions in different phases are caused by a loss of signal from said channel bank, said data signals are not transmitted until valid data signals have been detected for a predetermined length of time.

7. The method of claim 6, in which said predetermined length of time is 128 bits, and said data signals are considered valid if at least sixteen 1's occur in said 128 bits.

8. The method of claim 1, further comprising the step of allowing individual adjustment of each of burst protection time, error count, and bit count parameters which enter into the determination of the presence of said signal errors sufficient to trigger a transfer operation.

9. The method of claim 8, in which said burst protection time is adjustable from about 300 $\mu$s to about 40 ms, said error count is adjustable from about 1 to about 128, and said bit count is adjustable from about 1.28 Mbits to about 64 Mbits.

10. The method of claim 1, further comprising the step of preventing said switch from responding to any failure indicia for a predetermined period of time following a switching operation.

11. The method of claim 10, in which said predetermined period of time is substantially 600 milliseconds.

12. The method of claim 1, further comprising the step of allowing adjustment of the length of time which would result in the interpretation of said transimission of a signal consisting of a number of consecutive zeroes as said loss-of-signal condition.

13. The method of claim 12, in which said length of time is adjustable from about 5 ms to about 20 ms.

14. The method of claim 1, further comprising the step of minimizing phase changes by continually examining each span line of said group of span lines for operability, and disregarding any switching request if the requesting span line is operable at the time a spare span line becomes available for switching.

15. The method of claim 1, further comprising the step of preventing the transmission of less-than-full-length pulses by inhibiting the transmission of a pulse in progress at the time of a switching operation of said switch.

16. In a PCM telephone span switching system including a switch at each end of said span, each switch being arranged to automatically transfer data signals from an original span containing a failed span line to a spare span, and to automatically restore the data signal path over said original span in response to the simultaneous sending and receiving by said switches of a restoral code over said original span following the correction of the failure, said switches each ceasing the sending of said restoral code upon restoring said original signal path, the method of preventing one-sided restoral of said original signal path, comprising the steps of:
 (a) sensing a continuing receipt of restoral code for a predetermined time following an operation of said switch to restore said original signal path;
 (b) retransferring said data signals from said original span to said spare span at the switch experiencing said continuing restoral code receipt; and
 (c) re-initiating the operational sequence causing the transmission and reception of said restoral code by said switch.

17. The method of claim 16, in which said predetermined time is substantially fifty milliseconds.

* * * * *